(12) United States Patent
Makled et al.

(10) Patent No.: US 10,041,428 B2
(45) Date of Patent: Aug. 7, 2018

(54) METHODS AND SYSTEMS FOR ESTIMATING EXHAUST PRESSURE WITH A VARIABLE VOLTAGE OXYGEN SENSOR

(71) Applicant: Ford Global Technologies, LLC, Dearborn, MI (US)

(72) Inventors: Daniel A. Makled, Dearborn, MI (US); Gopichandra Surnilla, West Bloomfield, MI (US); Richard E. Soltis, Saline, MI (US); Michael McQuillen, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 23 days.

(21) Appl. No.: 15/438,629

(22) Filed: Feb. 21, 2017

(65) Prior Publication Data

US 2017/0167420 A1 Jun. 15, 2017

Related U.S. Application Data

(63) Continuation of application No. 14/637,060, filed on Mar. 3, 2015, now Pat. No. 9,574,510.

(51) Int. Cl.
*F02D 41/02* (2006.01)
*F02D 35/00* (2006.01)
*F02D 41/14* (2006.01)
*F02D 41/30* (2006.01)
*F02D 41/00* (2006.01)

(52) U.S. Cl.
CPC ....... *F02D 41/145* (2013.01); *F02D 41/0007* (2013.01); *F02D 41/029* (2013.01);
(Continued)

(58) Field of Classification Search
CPC .... F02D 41/029; F02D 41/0235; F02D 41/26; F02D 41/1448; F02D 41/145; F02D 41/1454; F02D 41/1458; F02D 41/1455; F02D 41/1402; F02D 41/3011; F02D 41/0007; F02D 35/0015; F02D 2041/1472; G01M 15/104
(Continued)

(56) References Cited

U.S. PATENT DOCUMENTS 5,261,271 A 11/1993 Bihn et al.
5,287,283 A 2/1994 Musa
(Continued)

FOREIGN PATENT DOCUMENTS

EP 2514955 A1 10/2012

*Primary Examiner* — Lindsay Low
*Assistant Examiner* — George Jin
(74) *Attorney, Agent, or Firm* — Julia Voutyras; McCoy Russell LLP

(57) ABSTRACT

Methods and systems are provided for estimating an engine exhaust pressure based on outputs from an exhaust oxygen sensor. In one example, a method may include estimating an exhaust pressure of exhaust gas flowing through an engine exhaust passage based on a difference between a first output of an oxygen sensor disposed in the exhaust passage and a second output of the oxygen sensor and then adjusting engine operation based on the estimated exhaust pressure. As one example, both the first and second outputs may be taken while operating the sensor in a variable voltage mode, after increasing a reference voltage of the oxygen sensor from a lower, first voltage to a higher, second voltage.

18 Claims, 8 Drawing Sheets

(52) U.S. Cl.
CPC ..... *F02D 41/1402* (2013.01); *F02D 41/1455* (2013.01); *F02D 41/3011* (2013.01); *F02D 2041/1433* (2013.01); *F02D 2200/0404* (2013.01); *F02D 2200/0406* (2013.01); *F02D 2200/0414* (2013.01); *F02D 2200/0802* (2013.01); *F02D 2200/101* (2013.01); *F02D 2200/1002* (2013.01); *F02D 2200/501* (2013.01)

(58) Field of Classification Search
USPC ................ 73/114.06, 114.76, 114.72, 114.73
See application file for complete search history.

(56) References Cited

U.S. PATENT DOCUMENTS

| | | | |
|---|---|---|---|
| 8,056,393 B2 | 11/2011 | Kawase et al. | |
| 8,495,996 B2 | 7/2013 | Soltis | |
| 8,522,760 B2 | 9/2013 | Soltis | |
| 8,731,806 B2 | 5/2014 | Soltis et al. | |
| 8,857,155 B2 | 10/2014 | Surnilla et al. | |
| 9,376,968 B2 | 6/2016 | Surnilla et al. | |
| 9,404,432 B2 | 8/2016 | Surnilla et al. | |
| 9,528,448 B2 | 12/2016 | Makled et al. | |
| 2003/0089164 A1* | 5/2003 | Bonadies | F02D 41/1441 73/114.39 |
| 2004/0200271 A1 | 10/2004 | van Nieuwstadt | |
| 2007/0045112 A1 | 3/2007 | Yashiro | |
| 2007/0068159 A1 | 3/2007 | Ueno et al. | |
| 2008/0262703 A1 | 10/2008 | Kawase et al. | |
| 2014/0156172 A1 | 6/2014 | Surnilla et al. | |
| 2014/0202437 A1 | 7/2014 | Surnilla et al. | |
| 2015/0337745 A1 | 11/2015 | MacNeille et al. | |
| 2016/0245204 A1 | 8/2016 | Makled et al. | |

* cited by examiner

METHODS AND SYSTEMS FOR ESTIMATING EXHAUST PRESSURE WITH A VARIABLE VOLTAGE OXYGEN SENSOR

CROSS-REFERENCE TO RELATED APPLICATION

The present application is a continuation of U.S. patent application Ser. No. 14/637,060 entitled "METHODS AND SYSTEMS FOR ESTIMATING EXHAUST PRESSURE WITH A VARIABLE VOLTAGE OXYGEN SENSOR," filed on Mar. 3, 2015, now U.S. Pat. No. 9,574,510, the entire contents of which are incorporated herein by reference for all purposes.

FIELD

The present description relates generally to methods and systems for operating a variable voltage exhaust gas sensor of an internal combustion engine.

BACKGROUND/SUMMARY

Measurements and/or estimates of exhaust pressure of an exhaust flow flowing through an exhaust passage of an internal combustion engine may be used as inputs in various vehicle control strategies in order to control engine operation. In one example, engines may include a dedicated, standalone pressure sensor positioned in an exhaust passage of the engine, upstream of a catalyst, to measure exhaust pressure. However, some engines may not include an exhaust pressure sensor. Dedicated exhaust pressure sensors may increase engine system costs and engine system control complexity. In another example, the exhaust pressure may be modeled based on alternate engine operating conditions and/or sensor measurements. However, the inventors herein have recognized that these exhaust pressure models may have errors that may cascade into additional models that use the modeled exhaust pressure. Additionally, certain models may be bounded by a window in which exhaust pressure may only be modeled under certain engine operating conditions. As a result, engine control based on exhaust pressure estimates during operation outside of the window may have reduced accuracy.

In one example, the issues described above may be addressed by a method for: estimating an exhaust pressure of exhaust gas flowing through an engine exhaust passage based on a difference between a first output of an oxygen sensor disposed in the exhaust passage and a second output of the oxygen sensor, both the first and second outputs taken after increasing a reference voltage of the oxygen sensor from a lower, first voltage to a higher, second voltage. In this way, an existing engine sensor (e.g., an exhaust oxygen sensor) may be used to more accurately estimate engine exhaust pressure, thereby increasing an accuracy of engine control based on exhaust pressure estimates.

As one example, an exhaust gas sensor (e.g., exhaust oxygen sensor) may be positioned in an exhaust passage of an engine and operated to provide indications of various exhaust gas constituents. Under select conditions, the exhaust gas sensor may be operated as a variable voltage (VVs) oxygen sensor. When operating in the VVs mode, a reference voltage of the exhaust gas sensor is increased from a lower, base voltage (e.g., approximately 450 mv) to a higher, target voltage (e.g., in a range of 900-1100 mV). In some examples, the higher, target voltage may be a voltage at which water molecules are partially or fully dissociated at the oxygen sensor while the base voltage is a voltage at which water molecules are not dissociated at the sensor. The inventors herein have recognized that exhaust gas sensors have a characteristic pressure dependency. Since pressure changes the ability for oxygen to pass through the sensor's diffusion barrier, exhaust pressure changes may be reflected in the sensor's pumping current output, especially while operating in VVs mode. Thus, a method may include generating a first output of the oxygen sensor while the sensor is operating at the higher, second voltage (e.g., target voltage) and then subsequently generating a second output of the oxygen sensor while the sensor is operating at the same second voltage and in a same air-fuel environment (e.g., the exhaust air-fuel ratio is substantially the same during generating both the first and second outputs). The difference between the first and second outputs may then be indicative of a change in exhaust pressure between a time of generating the first output and a time of generating the second output. In some examples, the exhaust pressure at the time of the second output may then be determined. A controller may then adjust engine operation based on the determined change in exhaust pressure and/or exhaust pressure during the time of generating the second output.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
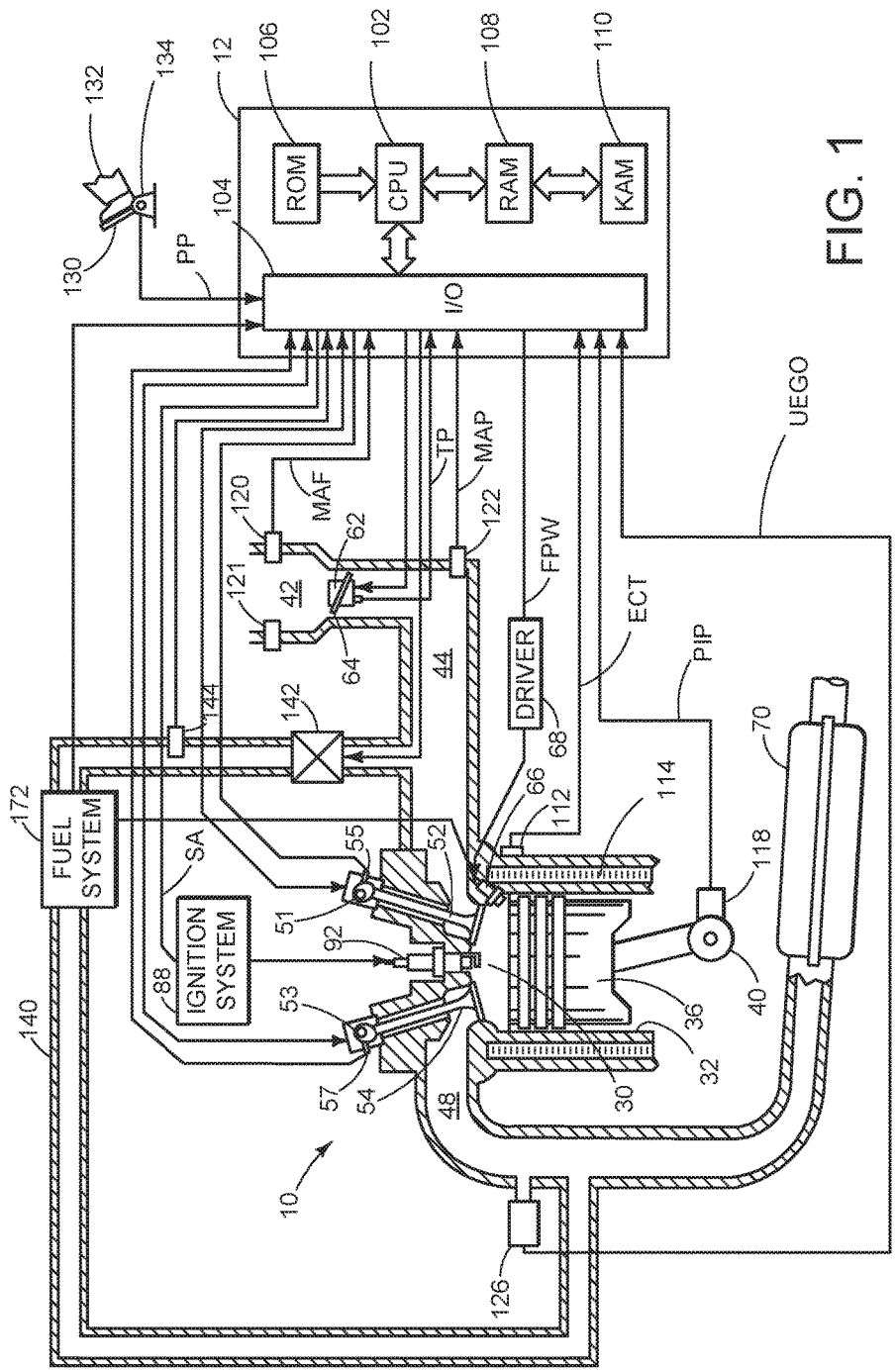
FIG. 1 shows a schematic diagram of an engine including an exhaust system and an exhaust gas sensor.
Figure 3:
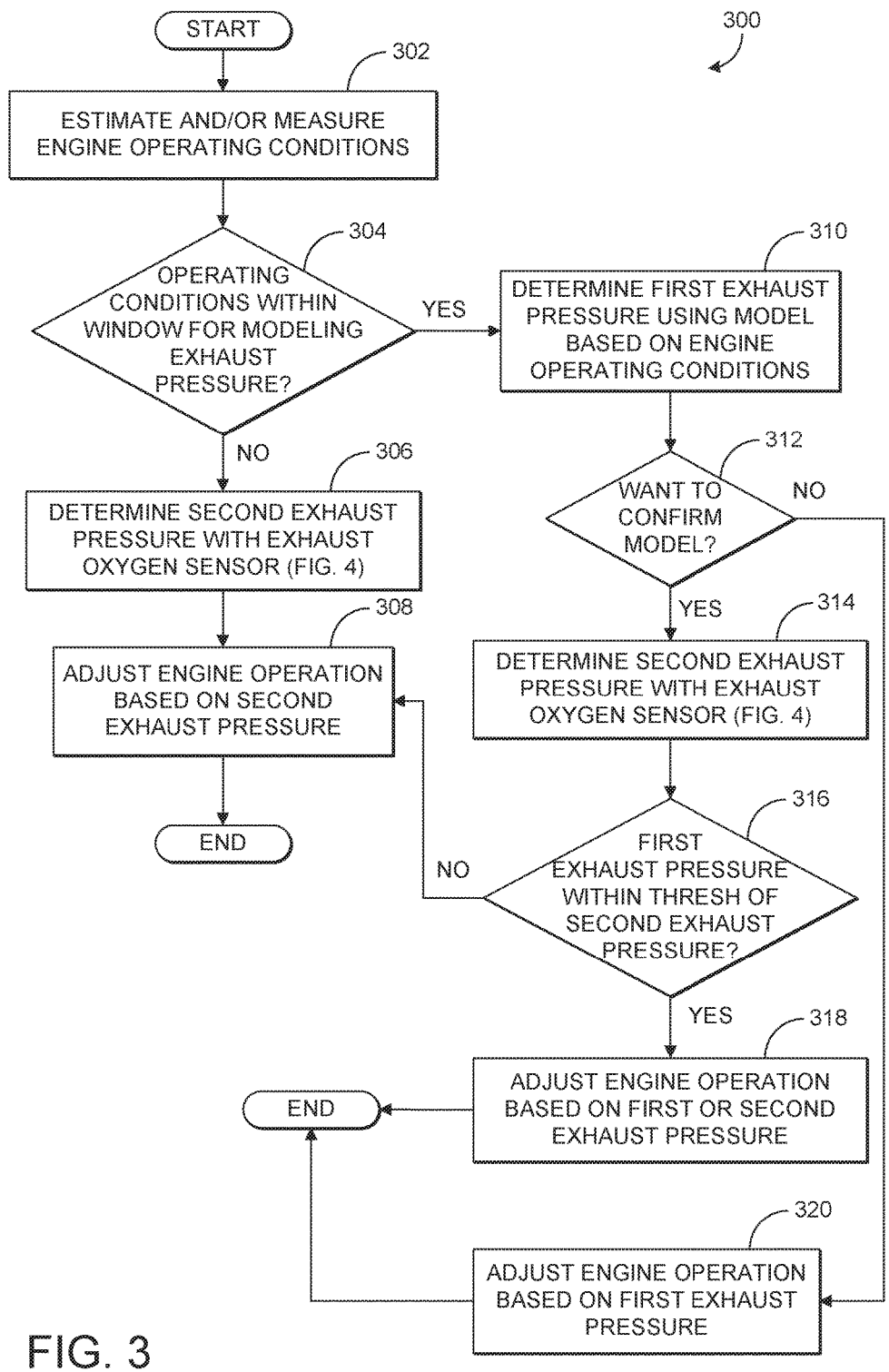
FIG. 3 shows a flow chart of a method for adjusting engine operation based on a modeled or estimated exhaust pressure.
Figure 4A:
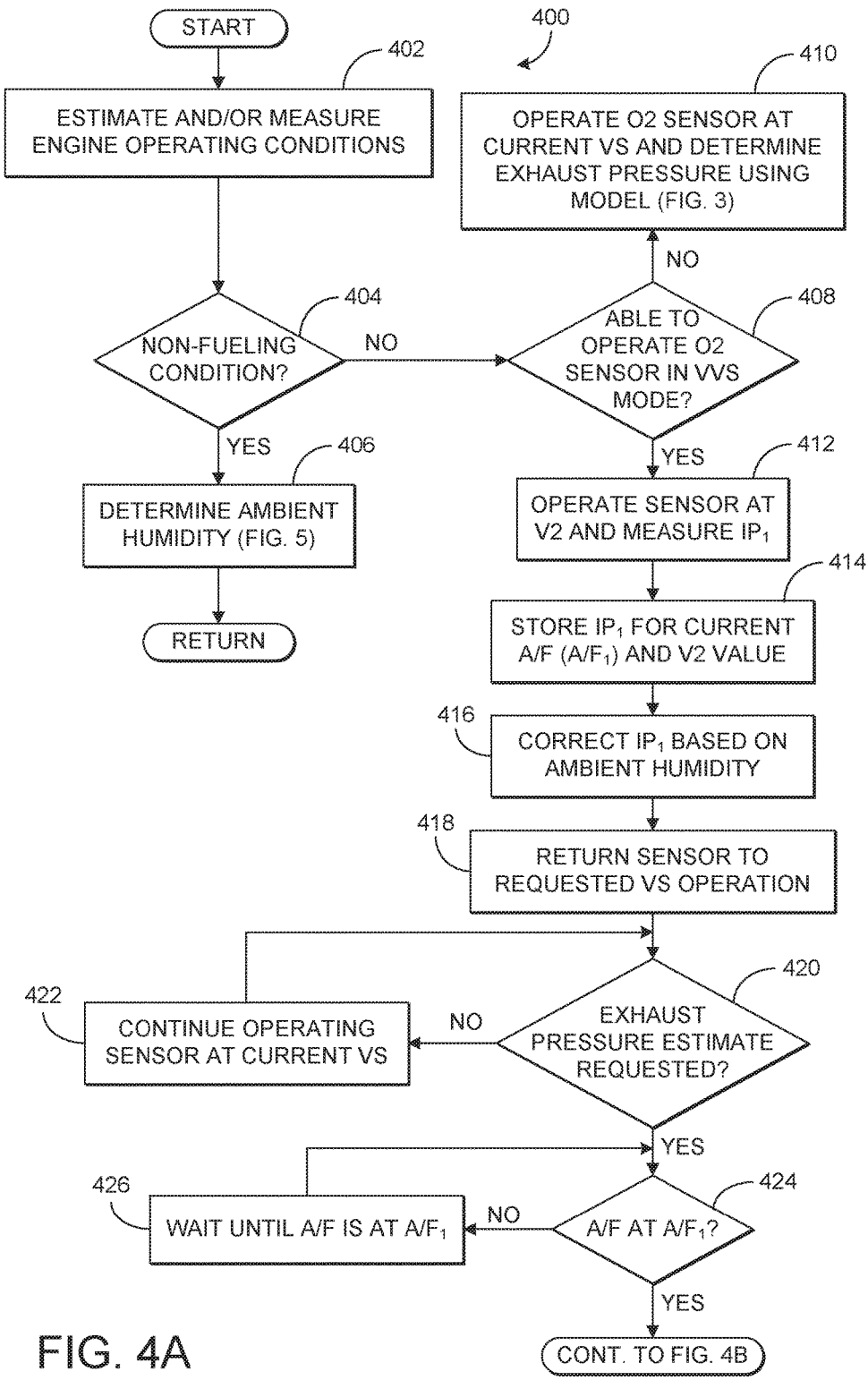
FIGS. 4A-4B show a flow chart of a method for estimating exhaust pressure in an engine with a variable voltage exhaust oxygen sensor.
Figure 4B:
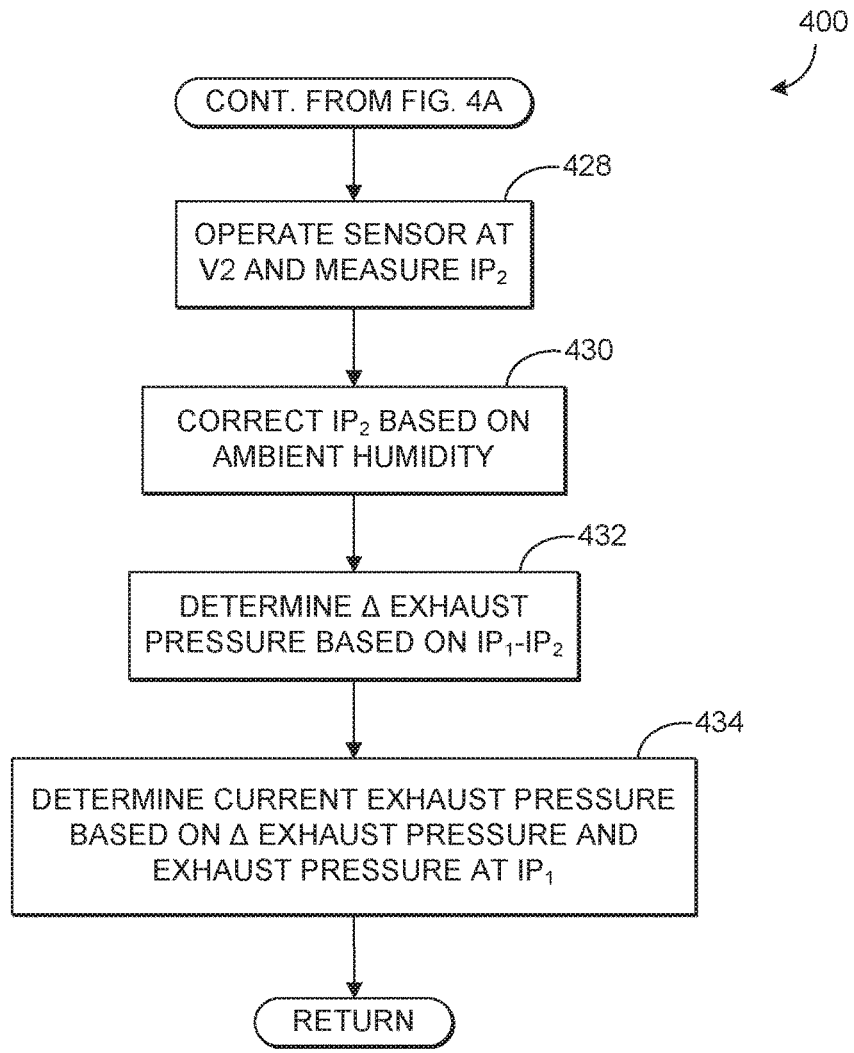

The following description relates to systems and methods for estimating an exhaust pressure of exhaust gas in an engine. As shown in FIG. 1, an engine may include an exhaust oxygen sensor located in an exhaust passage of the engine. The oxygen sensor may be a variable voltage (VVs) oxygen sensor, such as the VVs sensor shown in FIG. 2. As such, a reference voltage of the oxygen sensor may be adjusted between a lower, first voltage where water vapor and carbon dioxide are not dissociated, and a higher, second voltage where water and/or carbon dioxide are dissociated. Outputs of the oxygen sensor may be in the form of pumping currents which may be used to determine an air/fuel ratio of the exhaust gas. Exhaust oxygen sensors may have a pressure dependency which may be particularly noticeable while operating at the higher, second voltage. Thus, an exhaust oxygen sensor may be used to determine the exhaust pressure of exhaust gas flowing through the exhaust passage in which the sensor is installed. For example, FIGS. 4A-4B show a method for operating the exhaust oxygen sensor at the higher, second voltage and determining the exhaust pressure based on a change in output of the exhaust oxygen sensor between two subsequent measurements at the same voltage and air/fuel conditions. A controller may then use the oxygen sensor exhaust pressure estimate directly for engine control, or use it to confirm and/or correct an alternate exhaust pressure model, as shown in FIG. 3. In some examples, the outputs of the exhaust oxygen sensor may first be corrected for ambient humidity, as determined by a method shown at FIG. 5, before estimating the exhaust pressure. Additionally, while the exhaust oxygen sensor is operating at the higher, second voltage (and in VVs mode) to estimate exhaust pressure, the controller may estimate the exhaust air/fuel ratio using the method shown in FIGS. 6-7. In this way, engine control based on exhaust pressure estimates may be improved at a wider range of engine operating conditions.

Referring now to FIG. 1, a schematic diagram showing one cylinder of multi-cylinder engine 10, which may be included in a propulsion system of an automobile, is illustrated. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT), and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

In some embodiments, each cylinder of engine 10 may be configured with one or more fuel injectors for providing fuel thereto. As a non-limiting example, cylinder 30 is shown including one fuel injector 66. Fuel injector 66 is shown coupled directly to cylinder 30 for injecting fuel directly therein in proportion to the pulse width of signal FPW received from controller 12 via electronic driver 68. In this manner, fuel injector 66 provides what is known as direct injection (hereafter also referred to as "DI") of fuel into combustion cylinder 30.

It will be appreciated that in an alternate embodiment, injector 66 may be a port injector providing fuel into the intake port upstream of cylinder 30. It will also be appreciated that cylinder 30 may receive fuel from a plurality of injectors, such as a plurality of port injectors, a plurality of direct injectors, or a combination thereof.

Fuel tank in fuel system 172 may hold fuels with different fuel qualities, such as different fuel compositions. These differences may include different alcohol content, different octane, different heats of vaporization, different fuel blends, and/or combinations thereof etc. The engine may use an alcohol containing fuel blend such as E85 (which is approximately 85% ethanol and 15% gasoline) or M85 (which is approximately 85% methanol and 15% gasoline). Alternatively, the engine may operate with other ratios of gasoline and ethanol stored in the tank, including 100% gasoline and 100% ethanol, and variable ratios therebetween, depending on the alcohol content of fuel supplied by the operator to the tank. Moreover, fuel characteristics of the fuel tank may vary frequently. In one example, a driver may refill the fuel tank with E85 one day, and E10 the next, and E50 the next. As such, based on the level and composition of the fuel remaining in the tank at the time of refilling, the fuel tank composition may change dynamically.

The day to day variations in tank refilling can thus result in frequently varying fuel composition of the fuel in fuel system 172, thereby affecting the fuel composition and/or fuel quality delivered by injector 66. The different fuel compositions injected by injector 166 may herein be referred to as a fuel type. In one example, the different fuel compositions may be qualitatively described by their research octane number (RON) rating, alcohol percentage, ethanol percentage, etc.

It will be appreciated that while in one embodiment, the engine may be operated by injecting the variable fuel blend via a direct injector, in alternate embodiments, the engine may be operated by using two injectors and varying a relative amount of injection from each injector. It will be further appreciated that when operating the engine with a boost from a boosting device such as a turbocharger or supercharger (not shown), the boosting limit may be increased as an alcohol content of the variable fuel blend is increased.

Continuing with FIG. 1, intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12. In one embodiment, the intake passage 42 may additionally include a humidity sensor 121 for measuring ambient humidity. In another embodiment, the humidity sensor 121 may additionally or alternatively be placed in the exhaust passage 48.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 (e.g., exhaust oxygen sensor) is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. In another embodiment, the engine may include an additional exhaust gas sensor so that the engine includes two exhaust gas sensors, both positioned upstream of the emission control device 70 (e.g., upstream of any and all catalysts in the engine system). For example, the exhaust gas sensor 126 may be the air/fuel ratio sensor while the second exhaust gas sensor may be an exhaust sensor dedicated for determining engine exhaust pressure and not for determining air/fuel ratio.

Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Further, in the disclosed embodiments, an exhaust gas recirculation (EGR) system may route a desired portion of exhaust gas from exhaust passage 48 to intake passage 44 via EGR passage 140. The amount of EGR provided to intake passage 44 may be varied by controller 12 via EGR valve 142. Further, an EGR sensor 144 may be arranged within the EGR passage and may provide an indication of one or more of pressure, temperature, and concentration of the exhaust gas. Under some conditions, the EGR system may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and each cylinder may similarly include its own set of intake/exhaust valves, fuel injector, spark plug, etc.

Figure 2:
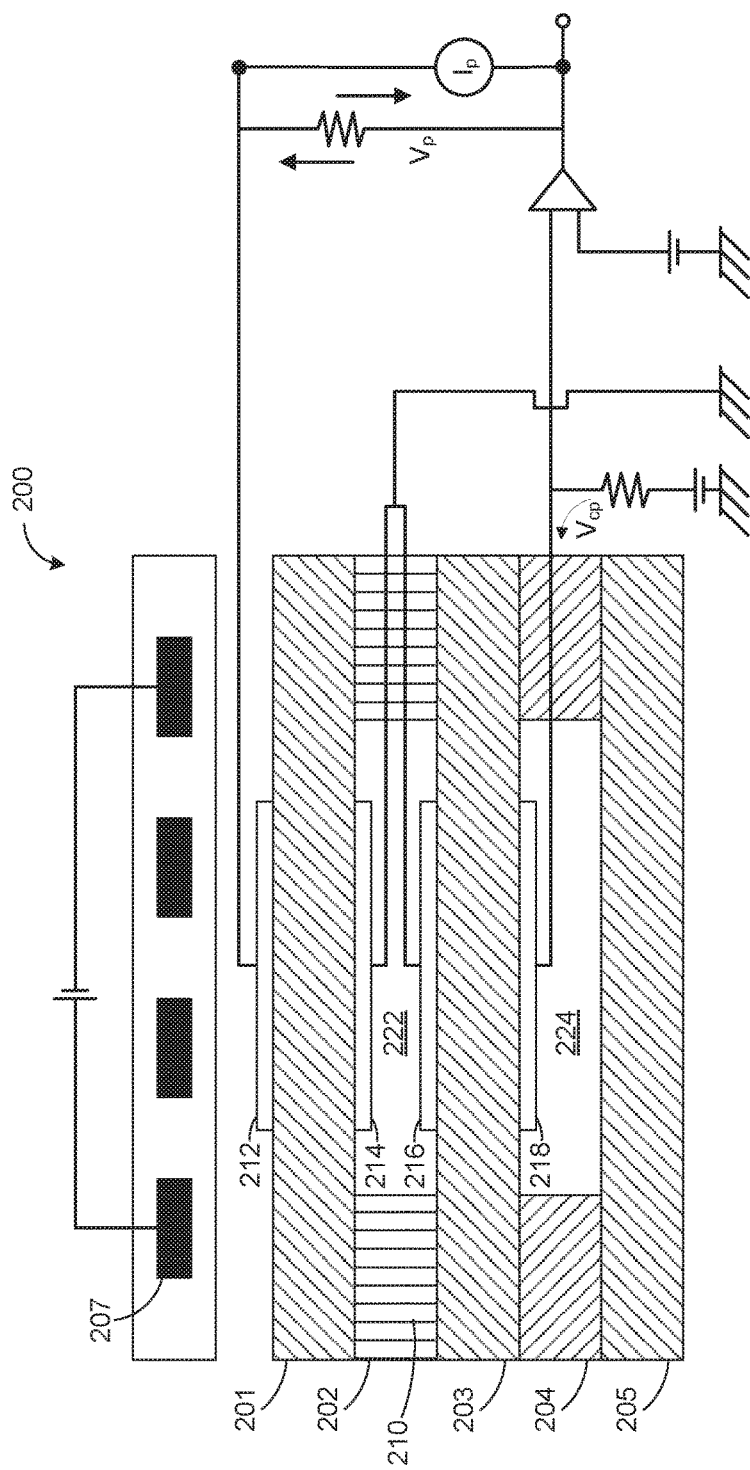
FIG. 2 shows a schematic diagram of an example exhaust gas sensor.

Next, FIG. 2 shows a schematic view of an example embodiment of a UEGO sensor 200 configured to measure a concentration of oxygen (O2) in an exhaust gas stream. Sensor 200 may operate as UEGO sensor 126 of FIG. 1, for example. Sensor 200 comprises a plurality of layers of one or more ceramic materials arranged in a stacked configuration. In the embodiment of FIG. 2, five ceramic layers are depicted as layers 201, 202, 203, 204, and 205. These layers include one or more layers of a solid electrolyte capable of conducting ionic oxygen. Examples of suitable solid electrolytes include, but are not limited to, zirconium oxide-based materials. Further, in some embodiments, a heater 207 may be disposed in thermal communication with the layers to increase the ionic conductivity of the layers. While the depicted UEGO sensor is formed from five ceramic layers, it will be appreciated that the UEGO sensor may include other suitable numbers of ceramic layers.

Layer 202 includes a material or materials creating a diffusion path 210. Diffusion path 210 is configured to introduce exhaust gases into a first internal cavity 222 via diffusion. Diffusion path 210 may be configured to allow one or more components of exhaust gases, including but not limited to a desired analyte (e.g., O2), to diffuse into internal cavity 222 at a more limiting rate than the analyte can be pumped in or out by pumping electrodes pair 212 and 214. In this manner, a stoichiometric level of O2 may be obtained in the first internal cavity 222.

Sensor 200 further includes a second internal cavity 224 within layer 204 separated from the first internal cavity 222 by layer 203. The second internal cavity 224 is configured to maintain a constant oxygen partial pressure equivalent to a stoichiometric condition, e.g., an oxygen level present in the second internal cavity 224 is equal to that which the exhaust gas would have if the air-fuel ratio was stoichiometric. The oxygen concentration in the second internal cavity 224 is held constant by pumping voltage Vcp. Herein, second internal cavity 224 may be referred to as a reference cell.

A pair of sensing electrodes 216 and 218 is disposed in communication with first internal cavity 222 and reference cell 224. The sensing electrodes pair 216 and 218 detects a concentration gradient that may develop between the first internal cavity 222 and the reference cell 224 due to an oxygen concentration in the exhaust gas that is higher than or lower than the stoichiometric level. A high oxygen concentration may be caused by a lean exhaust gas mixture, while a low oxygen concentration may be caused by a rich mixture.

A pair of pumping electrodes 212 and 214 is disposed in communication with internal cavity 222, and is configured to electrochemically pump a selected gas constituent (e.g., O2) from internal cavity 222 through layer 201 and out of sensor 200. Alternatively, the pair of pumping electrodes 212 and 214 may be configured to electrochemically pump a selected gas through layer 201 and into internal cavity 222. Herein, pumping electrodes pair 212 and 214 may be referred to as an O2 pumping cell.

Electrodes 212, 214, 216, and 218 may be made of various suitable materials. In some embodiments, electrodes 212, 214, 216, and 218 may be at least partially made of a material that catalyzes the dissociation of molecular oxygen. Examples of such materials include, but are not limited to, electrodes containing platinum and/or silver.

The process of electrochemically pumping the oxygen out of or into internal cavity 222 includes applying a voltage Vp (e.g., reference voltage) across pumping electrode pair 212 and 214. The pumping voltage Vp applied to the O2 pumping cell pumps oxygen into or out of first internal cavity 222 in order to maintain a stoichiometric level of oxygen in the cavity pumping cell. The resulting pumping current Ip is proportional to the concentration of oxygen in the exhaust gas. A control system (not shown in FIG. 2) generates the pumping current signal Ip as a function of the intensity of the applied pumping voltage Vp required to maintain a stoichiometric level within the first internal cavity 222. Thus, a lean mixture will cause oxygen to be pumped out of internal cavity 222 and a rich mixture will cause oxygen to be pumped into internal cavity 222.

It should be appreciated that the UEGO sensor described herein is merely an example embodiment of a UEGO sensor, and that other embodiments of UEGO sensors may have additional and/or alternative features and/or designs.

In this way, the oxygen sensor of FIG. 2 may be a variable voltage oxygen sensor configured to operate at a first, lower voltage (e.g., reference voltage) where water molecules are not dissociated and a second, higher voltage (e.g., reference voltage) where water molecules are fully dissociated. As such, the second voltage is higher than the first voltage.

As elaborated below, the UEGO sensor of FIG. 2 can be advantageously used to estimate an exhaust pressure of exhaust gas flowing through an engine exhaust passage, upstream of a catalyst (e.g., upstream of an exhaust aftertreatment system including one or more catalysts), as well as an ambient humidity. In particular, a change in pumping current (delta Ip) output by the sensor at two different reference voltages is used to determine the amount of oxygen coming from water and/or CO2 dissociation. In another example, comparing two pumping currents output by the sensor at two different time points, but at the same second, higher reference voltage, may be used to determine the engine exhaust pressure.

In another example, the exhaust oxygen sensor (e.g., UEGO sensor of FIG. 2 and/or exhaust gas sensor 126 of FIG. 1) may operate as a traditional oxygen sensor (e.g., air-fuel sensor), at the lower, first reference voltage (e.g., approximately 450 mV). This lower voltage may be referred to herein as the base reference voltage. Said another way, the UEGO may be operated as an air-fuel sensor in order to determine an exhaust air-fuel ratio. In some example, an estimate of the ethanol content of the fuel burned in the engine (e.g., EtOH estimate) may then be estimated based on the air-fuel ratio.

In this way, an exhaust gas sensor (e.g., exhaust oxygen sensor) may be operated to provide indications of various exhaust gas constituents. Under select conditions, the exhaust oxygen sensor may be operated in the variable voltage (VVs) mode. As described above, when operating in the VVs mode, a reference voltage of the exhaust gas sensor is increased from a lower, base voltage (e.g., approximately 450 mv, also referred to herein as nominal conditions) to a higher, target voltage (e.g., in a range of 900-1100 mV). In some examples, the higher, target voltage may be a voltage at which water molecules are partially or fully dissociated at the oxygen sensor while the base voltage is a voltage at which water molecules are not dissociated at the sensor.

The inventors herein have recognized that oxygen sensors have a characteristic pressure dependency. Since pressure changes the ability for oxygen to pass through the sensor's diffusion barrier, pressure changes (e.g., exhaust pressure changes) in the environment in which the sensor is placed (e.g., exhaust gas in exhaust passage) may be reflected in the sensor's pumping current output. At nominal Vs conditions (e.g., when the sensor is operated at the lower, base voltage), the exhaust oxygen sensor may output a pumping current of approximately zero, or an air/fuel ratio of approximately one. In VVs mode when the sensor is operation at the higher, second voltage, pumping current measurements may be well above zero since exhaust water is dissociated at the higher reference voltage. This may provide an increased sensitivity for detecting changes in exhaust pressure since changes in pumping current indicative of changes in exhaust pressure may be more pronounced when operating the sensor at the higher reference voltage than the lower, base voltage. As such, changes in exhaust pressure may be based on a change in pumping current output by the exhaust oxygen sensor between two different measurements (e.g., at two difference time points) when the oxygen sensor is operating at the same higher, target reference voltage and air/fuel control is enabled and controlled to the same air-fuel ratio during both measurements. The difference in pumping current between the two oxygen sensor measurements at the same reference voltage and air/fuel conditions may then be converted to a change in exhaust pressure using a conversion factor. The change in exhaust pressure determined based on the oxygen sensor outputs may then be used to adjust engine operation. Additionally or alternatively, the change in exhaust pressure determined based on the oxygen sensor output may be used to confirm, correct, or replace a modeled exhaust pressure determined with an exhaust pressure model. For example, the exhaust pressure model may estimate exhaust pressure based on additional engine operating conditions (other than oxygen sensor outputs). However, as explained above, these modeled estimates of exhaust pressure may have decreased accuracy over the oxygen sensor estimates, especially when the engine operating conditions are outside a set window (e.g., set engine operating conditions) for modeling the exhaust pressure using the selected engine operating conditions. Errors in the modeled exhaust pressure may cascade to other engine control models and/or engine control routines that use the modeled exhaust pressure as an input, thereby decreasing the accuracy of engine control. Determining the exhaust pressure based on exhaust oxygen sensor outputs, as described above and as detailed further below, may provide a more accurate exhaust pressure estimate, thereby increasing the accuracy of engine control.

The systems of FIGS. 1-2 provide for a system comprising: an exhaust oxygen sensor disposed in an exhaust passage of the engine upstream of a catalyst; and a controller with computer readable instructions for: adjusting engine operation based on an exhaust pressure of exhaust gas flowing through the exhaust passage, where the exhaust pressure is estimated based on a first output of the exhaust oxygen sensor while operating the exhaust oxygen sensor in a variable voltage mode where a reference voltage of the sensor is at a target voltage where water molecules are dissociated and while operating the engine at a first air-fuel ratio and a second output of the exhaust oxygen sensor obtained a duration after the first output, while operating the exhaust oxygen sensor at the target voltage and while operating the engine at the first air-fuel ratio. As one example, the duration is based on a time between generating the first output and a request received by the controller to estimate the exhaust pressure, where the request is responsive to one or more of the exhaust oxygen sensor operating at the target voltage, the engine operating outside an update window for an exhaust pressure model based on alternate engine operating parameters, and a request to confirm a modeled exhaust pressure determined from the exhaust pressure model.

Turning to FIG. 3, a method 300 is shown for adjusting engine operation based on a modeled or estimated (e.g., based on oxygen sensor outputs) exhaust pressure. The exhaust pressure may be a pressure of exhaust gas flowing through an exhaust passage of an engine. In one example, exhaust pressure may be modeled using an exhaust pressure model that is based on engine operating conditions other than oxygen sensor outputs. In another example, exhaust pressure may be estimated based on measurements from a single sensor, such as an exhaust oxygen sensor (e.g., exhaust gas sensor 156 and/or 200 shown in FIGS. 1-2). Method 300 and the other methods described herein may be executed by a controller, such as controller 12 shown in FIG. 1, according to instructions stored in a memory of the controller.

Method 300 begins at 302 by estimating and/or measuring engine operating conditions. Engine operating conditions may include engine load, boost level, engine speed, exhaust air/fuel ratio, engine temperatures, ambient humidity, ambient pressure, mass air flow, EGR flow, intake pressure, etc. A 304, the method includes determining if select engine operating conditions are within a window for modeling exhaust pressure. As one example, exhaust pressure is estimated with an exhaust pressure model that uses a select set of engine operating conditions as inputs. For example, the exhaust pressure may be modeled based on exhaust gas flow. In another example, the exhaust pressure may be modeled based on the make-up (e.g., component position and structure) of the engine and one or more variable engine operating conditions. For example, the make-up of the engine may include the design, location, and/or size of one or more of the catalytic converter, purge control valve (PCV), and exhaust gas recirculation (EGR) system. The type of EGR system (e.g., high pressure vs. low pressure) may also affect and be included in the exhaust pressure model. The exhaust pressure model may also be based on whether the engine includes a particulate filter (and possible its size, location, and style of design) and a regenerative method or system used for the filter. The one or more variable engine operating conditions used as inputs to the exhaust pressure model may include engine speed (e.g., RPM), vehicle speed, engine load, intake air temperature, inferred barometric pressure, humidity, catalyst temperature, manifold absolute pressure (MAP), and/or throttle position. In this way, the exhaust pressure model may be based on the engine component structure and one or more engine operating conditions, other than outputs from an exhaust oxygen sensor. However, the exhaust pressure may only be determined using the model if the select engine operating conditions are within threshold ranges and/or if certain operating conditions are met. For example, under some operating conditions, the exhaust pressure model may have reduced accuracy that may result in degraded engine control.

If the engine operating conditions for determining the modeled exhaust pressure are not within the set window, the method continues on to 306 to determine a second exhaust pressure (e.g., a second estimate of the exhaust pressure) based on outputs of the exhaust oxygen sensor. For example, the second estimate of the exhaust pressure determined at 306 may be based on oxygen sensor measurements and not based on an exhaust pressure model. As one example, the exhaust oxygen sensor may be a dedicated sensor for estimating exhaust pressure. In another example, the exhaust oxygen sensor may be used for both determining exhaust pressure and an exhaust air/fuel ratio. The method at 306 is described in further detail below with reference to FIGS. 4A-4B. After determining the second exhaust pressure using the exhaust oxygen sensor, the method continues to 308 to adjust engine operation based on the second exhaust pressure. As one example, the engine controller may use the second exhaust pressure as an input in additional control routines and operating parameter models. In another example, adjusting engine operation based on the second exhaust pressure may include adjusting one or more of engine fueling, engine air charge, engine boosting (e.g., turbocharger operation), regeneration of a particulate filter, etc.

Alternatively at 304, if the engine operating conditions for determining the modeled exhaust pressure are within the set window, the method continues on to 310 to determine a first exhaust pressure (e.g., a first estimate of the exhaust pressure) using an exhaust pressure model based on alternate engine operating conditions. For example, the first exhaust pressure may be modeled based on exhaust gas flow. In another example, as described above, the first exhaust pressure may be modeled based on the engine structure (e.g., the presence, size, and location of certain engine components such as the muffler, catalytic converter, PCV valve, EGR system, etc.) and one or more engine operating conditions (such as engine speed, vehicle speed, engine load, intake air temperature, inferred barometric pressure, humidity, catalyst temperature, manifold absolute pressure (MAP), and/or throttle position). In this way, the first exhaust pressure model may be based on the engine component structure and one or more engine operating conditions, other than outputs from an exhaust oxygen sensor. The method then continues on to 312 to determine whether confirmation of the first exhaust pressure value is requested. In some examples, the modeled first exhaust pressure may always be confirmed. In another example, the modeled first exhaust pressure may only be confirmed under certain engine operating conditions or when an estimated second exhaust pressure (via the exhaust oxygen sensor) is available for the current operating conditions. If confirmation is not required or requested, the method continues to 320 to adjust engine operation (as discussed above at 308) based on the first exhaust pressure (e.g., the modeled value) and not the second exhaust pressure (e.g., the estimated value based on the oxygen sensor outputs).

Alternatively, if confirmation of the first exhaust pressure is required, the method continues to 314 to determine the second exhaust pressure based on outputs of the exhaust oxygen sensor. The method at 314 may be the same as the method at 306 and is described in further detail below with reference to FIGS. 4A-4B. Method 300 continues on to 316 to determine whether the first exhaust pressure is within a threshold of the second exhaust pressure (e.g., a difference between the first and second exhaust pressures is less than the threshold). If the first and second exhaust pressures are within the threshold of one another, the method continues on to 318 where the controller may adjust engine operation based on either the first or the second exhaust pressure. Alternatively, if the first and second exhaust pressures are not within the threshold of one another, the method continues on to 308 to adjust engine operation based on the second exhaust pressure and not the first exhaust pressure. As such, the second exhaust pressure estimate may replace the traditional modeled first estimate of the exhaust pressure for engine control. In other embodiments, if the first and second exhaust pressures are not within the threshold of one another, the method may include correcting the first exhaust pressure based on the second exhaust pressure.

Continuing to FIGS. 4A-4B, a method 400 is shown for estimating exhaust pressure in an engine with a variable voltage (VVs) exhaust oxygen sensor. The VVs exhaust oxygen sensor (e.g., the exhaust gas sensor 156 and/or 200 shown in FIGS. 1-2) may be positioned in an engine exhaust passage, downstream of the engine and upstream of a catalyst. As described above, the exhaust oxygen sensor may provide an estimate of the exhaust pressure of exhaust flowing through the exhaust pressure which may have a higher accuracy compared to a modeled estimate of the exhaust pressure. As one example, a controller, such as controller 12 shown in FIG. 1, may execute method 400 to determine the exhaust pressure using the VVs exhaust oxygen sensor during method 300 when the conditions for modeling the exhaust pressure with the exhaust pressure model are not met. As another example, the controller may execute method 400 to estimate the exhaust pressure with the VVs exhaust oxygen sensor whenever conditions are met for operating the oxygen sensor in VVs mode. In this way, exhaust pressure estimates using the oxygen sensor may be continuously acquired whenever select sensor conditions are met and not just when the exhaust pressure model may have reduced accuracy (as described above with reference to FIG. 3). Method 400 may further include determining ambient humidity and then storing the ambient humidity within a memory of the controller.

Method 400 begins at 402 by estimating and/or measuring engine operating conditions. Engine operating conditions may include but are not limited to air/fuel ratio (e.g., A/F), amount of EGR entering the combustion chambers, and fueling conditions, for example.

Once the engine operating conditions are determined, method 400 continues to 404 where it is determined if the engine is under non-fueling conditions. Non-fueling conditions include vehicle deceleration conditions and engine operating conditions in which the fuel supply is interrupted but the engine continues spinning and at least one intake valve and one exhaust valve are operating; thus, air is flowing through one or more of the cylinders, but fuel is not injected in the cylinders. Under non-fueling conditions, combustion is not carried out and ambient air may move through the cylinder from the intake to the exhaust. In this way, a sensor, such as a UEGO sensor (e.g., exhaust oxygen sensor), may receive ambient air on which measurements, such as ambient humidity detection, may be performed.

As noted, non-fueling conditions may include, for example, deceleration fuel shut-off (DFSO). DFSO is responsive to the operator pedal (e.g., in response to a driver tip-out and where the vehicle accelerates greater than a threshold amount). DSFO conditions may occur repeatedly during a drive cycle, and, thus, numerous indications of the ambient humidity may be generated throughout the drive cycle, such as during each DFSO event. As such, the fuel type may be identified accurately based on an amount of water in the exhaust gas despite fluctuations in humidity between drive cycles or even during the same drive cycle.

Continuing with FIGS. 4A-4B, if is determined that the engine is under non-fueling conditions such as DFSO, routine 400 continues to 406 to determine ambient humidity using the methods of FIG. 5, as described further below. As one example, ambient humidity may be determined by modulating the reference voltage of the exhaust oxygen sensor and estimating ambient humidity based on the change in pumping current during the modulating. In alternate embodiments, ambient humidity may be determined using alternate methods (other than using the VVs sensor, as described below with reference to FIG. 5) during fueling and/or non-fueling conditions.

Alternatively, if it is determined that the engine is not under non-fueling conditions, method 400 of FIGS. 4A-4B moves to 408 where the controller may determine if the exhaust oxygen sensor may be operated in variable Vs mode (e.g., if the sensor is able to operate at the second, higher reference voltage). As described above, VVs mode includes adjusting the reference voltage (also referred to herein as the pumping voltage) of the oxygen sensor from a lower, base voltage (e.g., approximately 450 mV) to a higher, target voltage where water molecules are dissociated at the sensor (e.g, 1000-1100 mV). However under certain conditions, such as when the sensor is actively measuring gas constituents (e.g., an air/fuel ratio) and/or the sensor has been operating at the higher, target voltage for greater than a threshold duration, the exhaust oxygen sensor may be operated at the lower, based voltage (e.g., first voltage) and not the higher, target voltage (e.g., second voltage). If the exhaust oxygen sensor cannot be operated at the higher, second voltage, the method continues to 410 to operate the oxygen sensor at the current voltage (e.g., first voltage) and determine exhaust pressure using the exhaust pressure model, as described above with reference to FIG. 3.

Alternatively at 408, if the sensor may be operated at the higher, second voltage, the method continues to 412 to operate the exhaust oxygen sensor at the higher, second reference voltage, V2, and measure the pumping current, Ip1, output by the sensor. For example, the method at 412 includes applying the second reference voltage V2 to the pumping cell of the exhaust gas sensor and receiving the first pumping current Ip1. In another example, the method at 412 may include increasing the reference voltage of the exhaust oxygen sensor from the lower, first reference voltage V1 to the higher, second reference voltage V2. The first reference voltage may pump oxygen from the oxygen pumping cell, but may have a low enough value so as to not dissociate water (e.g., H2O) molecules in the pumping cell (e.g., V1=approximately 450 mV). In some examples, the first voltage may be the same as the voltage applied to the sensor during non-VVs mode operation. Conversely, the second reference voltage may be greater than the first reference voltage, and the second voltage may be high enough to dissociate oxygen compounds such as water molecules. Application of the second reference voltage across the oxygen pumping cell generates the first pumping current Ip1. The first pumping current may be indicative of an amount of oxygen and water in the sample gas (e.g., oxygen that already exists in the sample gas) plus oxygen from water molecules dissociated when the second reference voltage is applied.

Figure 6:
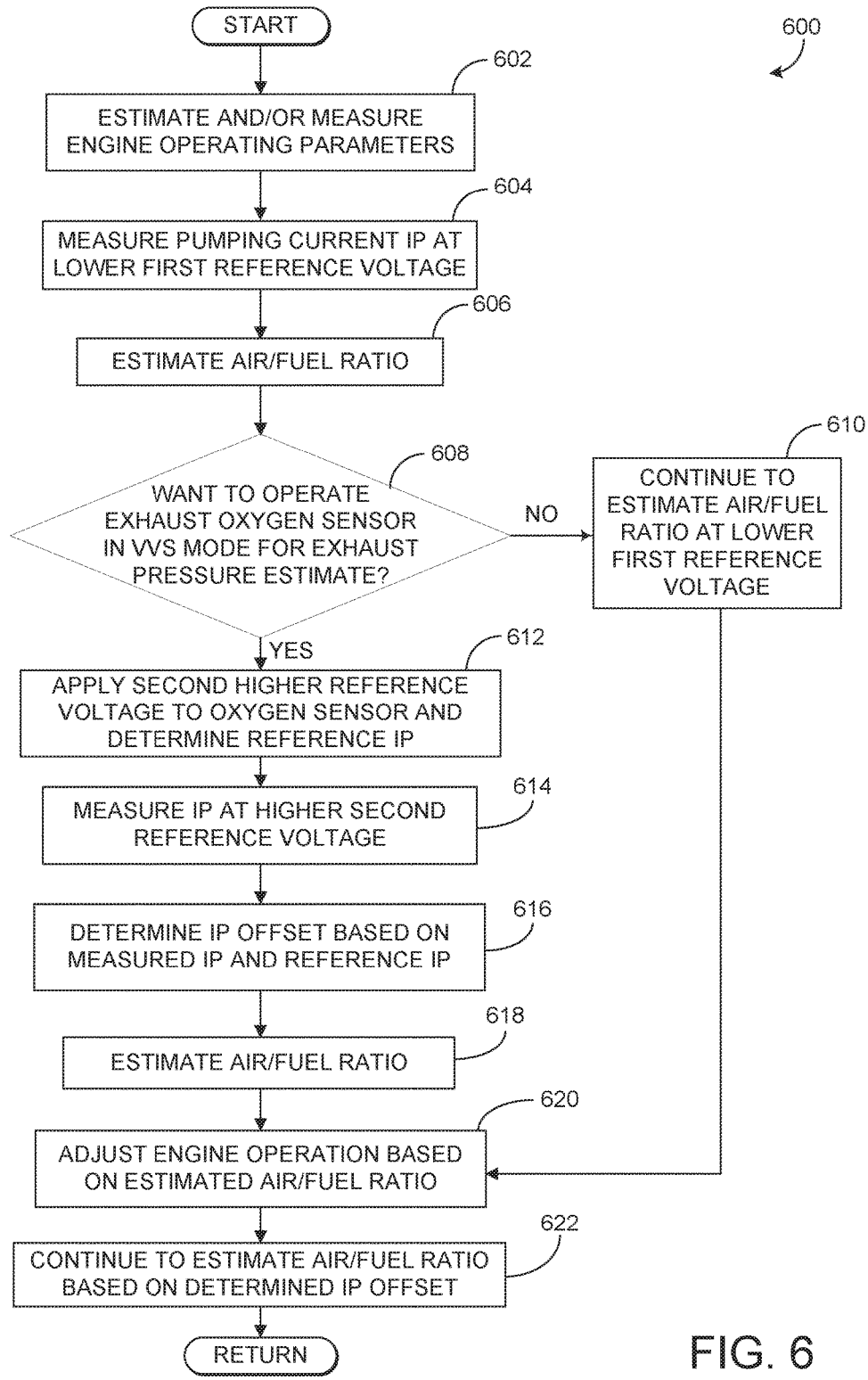
FIG. 6 shows a flow chart of a method for estimating an exhaust air/fuel ratio during variable voltage operation of an exhaust oxygen sensor.

At 414, the method may include storing the first pumping current Ip1 in a memory of the controller for the current air/fuel ratio (A/F) value, $A/F_1$ and the second reference voltage value V2 (e.g., 1080 mV, 1100 mV, etc.). For example, at 414, the method may further include measuring the A/F while (or just before or just after) generating the first pumping current Ip1. If the same exhaust oxygen sensor is used to determine the exhaust air/fuel ratio and the exhaust pressure, the method at 414 may include estimating the air/fuel ratio using the exhaust oxygen sensor operating in VVs mode, as shown in FIG. 6 and described further below. Said another way, if the exhaust oxygen sensor is the air/fuel sensor and not a dedicated VVs sensor for determining exhaust pressure, the controller may simultaneously determine the exhaust air/fuel ratio and obtain the first pumping current for determining the exhaust pressure while operating at the second voltage V2.

The method continues to 416 to correct the first pumping current Ip1 based on ambient humidity. For example, ambient humidity may be subtracted from Ip1 which is indicative of a total amount of water in the exhaust (including humidity) and oxygen. In one example, the ambient humidity may be determined based on output of the exhaust oxygen sensor during non-fueling conditions. In another example, the ambient humidity may be determined using an alternate method based on engine operating conditions. The method at 416 may include instantaneously determining the ambient humidity or looking up a most recent ambient humidity estimate in the memory of the controller. The method for determining ambient humidity is described further below with reference to FIG. 5.

After performing the ambient humidity correction on Ip1, the method continues to 418 to return the exhaust oxygen sensor to a requested voltage (e.g., Vs) operation. For example, the method at 418 may include decreasing the reference voltage from the second voltage to the lower, first voltage and returning the sensor to non-VVs operation. In another example, the method at 418 may include maintaining the sensor at the second reference voltage. In yet another example, the method at 418 may include modulating the reference voltage of the exhaust oxygen sensor between the first and second voltages for a duration. In still another example, the method at 418 may include operating the sensor at a third reference voltage, higher than the base, first voltage, but different than the value of the second voltage (e.g., higher or lower than the second voltage). For example the third voltage may be high enough to dissociate water molecules at the sensor, but a different value that the second voltage. The voltage and mode of operation of the sensor may be based on requests to determine additional exhaust gas constituents with the sensor. Different routines for determining operating parameters based on the sensor output may require the sensor to operate at different reference voltages.

At 420, the method includes determining if an exhaust pressure estimate is requested (e.g., determining if it is time to estimate the exhaust pressure using the exhaust oxygen sensor). As one example, and as described above with reference to FIG. 3, an exhaust pressure estimate using the oxygen sensor may be requested when select parameters for determining the exhaust pressure using an exhaust pressure model are outside of an update window (or outside of thresholds for utilizing the model). In another example, the exhaust pressure estimate using the oxygen sensor may be requested in order to confirm, correct, and/or replace the modeled exhaust pressure determine with the exhaust pressure model. In yet another example, the exhaust pressure estimate using the oxygen sensor may be requested at a set interval (e.g., after a duration of time or engine operation) or whenever the sensor is operated at the higher, second voltage regardless of the accuracy of the exhaust pressure model. If there is not a request to determine the exhaust pressure using the exhaust oxygen sensor, the method continues on to 422 to continue operating the sensor at the current voltage.

Conversely, if there is a request to estimate exhaust pressure using the exhaust oxygen sensor, the method continues on to 424 to determine if the currently measured air/fuel ratio is at the same air/fuel ratio determined at 414 (e.g., A/F$_1$). Said another way, the method at 424 includes determining if the current exhaust air/fuel ratio is being controlled to the same air/fuel ratio as during the first pumping voltage Ip1 measurement. As such, the method at 424 includes determining if the engine is operating under the same exhaust air/fuel conditions as during the method at steps 412-414. If the air-fuel ratio is not at A/F$_1$, the method continues to 426 to wait until the air-fuel ratio is substantially the same as A/F$_1$. In another embodiment, the method at 426 may include controlling the air/fuel ratio to A/F$_1$. For example, the controller may adjust fuel injection such that the exhaust air/fuel ratio is the same value, A/F$_1$, as previously measured at 414.

Once the engine is operating under the same air-fuel conditions as during the measurement of Ip1, the method continues to 428 to operate the exhaust oxygen sensor at the second reference voltage V2 and measure a second pumping current, Ip2, output by the oxygen sensor. The method at 428 includes applying the same reference voltage value, V2, as the voltage applied during the measurement of Ip1 (at 412). Thus, the oxygen sensor is controlled to the same target, second voltage V2 during both the measurement of Ip1 and Ip2. In this way, both the Ip2 and Ip1 measurements are taken in the same air/fuel conditions and at the same reference voltage. At 430, the method includes correcting the second pumping current Ip2 based on ambient humidity. The method at 430 may be the same as the method at 416, as described above.

At 432, the method includes determining a change in exhaust pressure based on a difference between the first pumping current Ip1 and the second pumping current Ip2. If both Ip1 and Ip2 were acquired in the same exhaust pressure environment, the delta Ip (e.g., difference between the two measurements) would be zero. However, if the exhaust pressure changes between each of the measurements (e.g., changes between a time of the first measurement and a time of the second measurement), the delta Ip will reflect the difference. The change in exhaust pressure may then be determined by multiplying the difference between the first and second pumping currents (Ip1-Ip2) by a conversion factor. The conversion factor may be a factor that converts the pumping current to an equivalent pressure value.

The change in exhaust pressure determined at 432 may be a change in exhaust pressure from an initial measurement (Ip1 being the initial measurement and Ip2 being the current, or most recent" exhaust pressure environment). In another example, the change in exhaust pressure determined at 432 may be a change in exhaust pressure from a previous measurement (Ip1 being the previous oxygen sensor output used to determine exhaust pressure). If the exhaust pressure during the measurement of Ip1 is known (e.g., from another sensor or estimate, such as a modeled exhaust pressure, or from previously determining Ip1 using method 400 and a different initial or previous pumping current output), the exhaust pressure (e.g., instantaneous exhaust pressure) during the time of the measurement of Ip2 may be determined. For example, the method at 434 may include determining the current exhaust pressure based on the change in exhaust pressure determined at 432 and the exhaust pressure known at Ip1. As one example, the exhaust pressure at Ip1 may be looked up in the memory of the controller as a value previously-stored during the method at 412. After determining the exhaust pressure, the controller may store the exhaust pressure and the associated pumping current, voltage, and A/F in the memory of the controller to compare with subsequent oxygen sensor outputs for determining updated exhaust pressure values.

Also after determining the exhaust pressure, the controller may adjust engine operation based on the exhaust pressure (or based on the change in exhaust pressure), as described above with reference to FIG. 3. Thus, method 400 may be executed during the method of FIG. 3 to determine an estimate of the exhaust pressure of the engine using the exhaust oxygen sensor. As described above, operating the oxygen sensor at the higher, second reference voltage may increase the sensitivity of the sensor for sensing changes in exhaust pressure. As a result, the resulting exhaust pressure estimate may have increased accuracy of alternate exhaust pressure estimate methods (e.g., such as modeling the pressure based on alternate engine operating conditions). This may, in turn, increase the accuracy of engine control based on the estimated exhaust pressure. Operating the oxygen sensor at the higher, second voltage also allows for the exhaust pressure estimate to be determined in both fueled and un-fueled environments. Said another way, method 400 may be executed during fueling conditions and during non-fueling conditions, such as DFSO. This may increase the engine operating window (e.g., increase a number of operating conditions) for which exhaust pressure estimation is possible.

Figure 5:
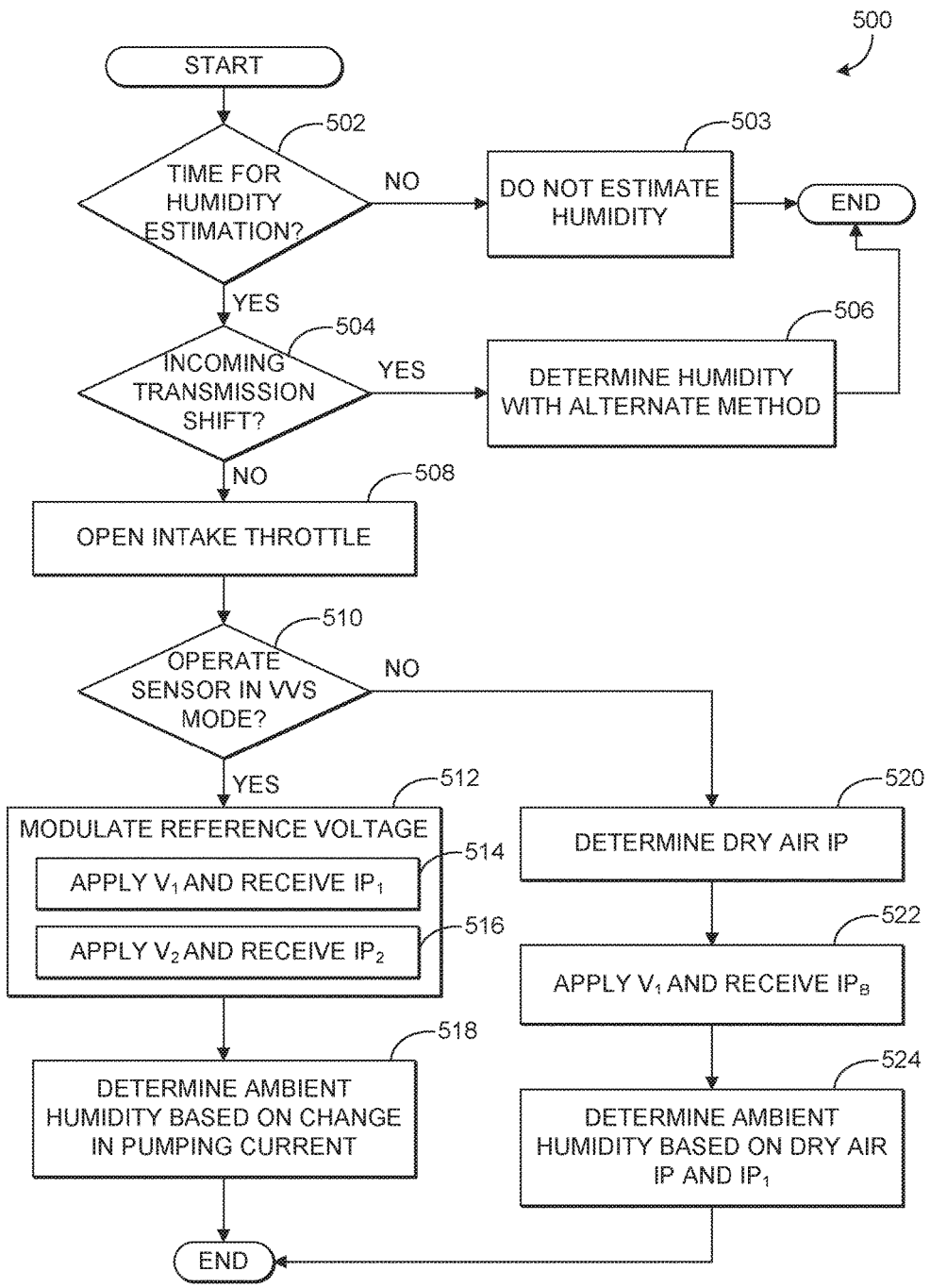
FIG. 5 shows a flow chart of a method for estimating ambient humidity.

Turning now to FIG. 5, a method 500 is shown for estimating ambient humidity with a VVs exhaust oxygen sensor (such as the exhaust oxygen sensor 126 shown in FIGS. 1 and 200 shown in FIG. 2). The method begins at 502 by determining if it is time for ambient humidity estimation. In one example, method 500 may continue from 406 of method 400, as described above. As such, if the engine is operating under non-fueling conditions, the method may continue to 504. In another example, method 500 may be executed after a duration, such as after a period of engine operation, a number of engine cylinders, a duration of vehicle travel, or after a distance of vehicle travel. In another example, method 500 may be executed upon engine start-up. If it is not time for ambient humidity estimation, the method continues to 503 to not estimate ambient humidity and the method ends. If an ambient humidity measurement is requested from another control routine, the controller may look-up a previously stored ambient humidity estimate.

At 504, the method includes determining if there is an incoming transmission shift. An incoming transmission shift may be predicted based on one or more of whether or not a shift request flag has been set, observation of one or more operator pedals, and/or vehicle acceleration. During transmission shifts following non-fueling conditions (e.g., deceleration fuel-shut off), humidity detection using the exhaust oxygen sensor may not be possible due to the need to decrease load during the transmission shift (and humidity detection using the exhaust oxygen sensor may include opening the throttle to reduce PCV noise). Thus, if a transmission shift is predicted at 504, the method continues to 506 to determine the ambient humidity using an alternate method. As one example, the alternate method may include measuring humidity from a dedicated humidity sensor (if the engine includes a humidity sensor). The alternate method may further include determining an equivalent pumping current, Ip, for an oxygen sensor based on the humidity measurement and a current voltage set point of the exhaust oxygen sensor used for exhaust pressure determination in FIGS. 4A-4B. As another example, the alternate method for determining humidity may include estimating ambient humidity based on ambient air temperature. For example, ambient humidity may be estimated based on the ambient air temperature and a saturation vapor pressure estimated using an assumption of 50% relative humidity. An equivalent pumping current may then be determined based on the humidity estimate.

Alternatively, if there is not an incoming transmission shift predicted at 504, the method continues on to 508 to open the intake throttle (e.g., throttle 62 shown in FIG. 1) to further reduce the amount of hydrocarbons flowing past the exhaust oxygen sensor (e.g., exhaust oxygen sensor 126 shown in FIG. 1 and/or 200 shown in FIG. 2). For example, opening the throttle may reduce the amount of hydrocarbons from PCV coming through the exhaust air. More specifically, if the intake throttle is closed during an engine non-fueling condition, a large intake manifold vacuum is generated which can draw in positive crankcase ventilation (PCV) hydrocarbons. As such, even if a PCV port is closed during the DFSO, the vacuum may be sufficiently strong to draw in PCV hydrocarbons through the piston rings. The PCV flow drawn in may be aggravated in an aging engine due to leakage of PCV gases past the piston rings and valves. The ingested hydrocarbons may affect the output of the exhaust gas oxygen sensor and can confound the humidity measurements. In particular, the hydrocarbon effect leads to a sensor output that overestimates the ambient humidity.

At 510, the method includes determining if the exhaust oxygen sensor should be operated in variable voltage (VVs) mode. As described above, VVs mode includes adjusting the reference voltage (also referred to herein as the pumping voltage) of the oxygen sensor from a lower, base voltage (e.g., approximately 450 mV) to a higher, target voltage where water molecules are dissociated at the sensor. In some examples, operating in VVs mode may include continuously modulating the reference voltage between the base voltage (e.g., first voltage) and the target voltage (e.g., second voltage). In some examples, continuously operating the oxygen sensor in VVs mode, and particularly at the higher, second voltage may degrade the sensor over time. Thus, it may be advantageous to reduce the amount of time the sensor spends operating in VVs mode. In one example, the sensor may only be operated in VVs mode if a duration has passed since a previous VVs operation period. In another example, the sensor may only be operated in VVs mode if a total duration of VVs mode operation for a period of engine use is below an upper threshold level. In yet another example, the sensor may operate in VVs mode based on a duration (e.g., amount of time elapsed) since a previous measurement. The sensor may also be turned off if a total threshold time has passed since a measurement. In another embodiment, continuously operating the oxygen sensor at the higher, second voltage may not degrade the sensor if the gas composition and second voltage are within certain threshold ranges that reduce degradation. In this embodiment, if the gas composition and second voltage of the sensor are maintained within their threshold ranges, the sensor may default to operating in VVs mode and the method may continue to 512.

If the controller determines that it is able operate the exhaust oxygen sensor in VVs mode, the method continues on to 512 to modulate the reference voltage of the exhaust oxygen sensor between the first voltage (V1) and the second voltage (V2). For example, the method at 512 includes first, at 514, applying the first voltage (V1) to the oxygen pumping cell of the exhaust gas sensor and a receiving the first pumping current (Ip1). The first reference voltage may have a value such that oxygen is pumped from the cell, but low enough that oxygen compounds such as H2O (e.g., water) are not dissociated (e.g., V1=approximately 450 mV). Application of the first voltage generates an output of the sensor in the form of the first pumping current (Ip1) that is indicative of the amount of oxygen in the sample gas. In this example, because the engine is under non-fueling conditions, the amount of oxygen may correspond to the amount of oxygen in the fresh air surrounding the vehicle. The method at 512 further includes, at 516, applying the second voltage (V2) to the oxygen pumping cell of the sensor and receiving a second pumping current (Ip2). The second voltage may be greater than the first voltage applied to the sensor. In particular, the second voltage may have a value high enough to dissociate a desired oxygen compound. For example, the second voltage may be high enough to dissociate H2O molecules into hydrogen and oxygen (e.g., V2=approximately 1.1 V). Application of the second voltage generates the second pumping current (I2) that is indicative of the amount of oxygen and water in the sample gas. It will be understood that the term "water" in the "amount of oxygen and water" as used herein refers to the amount of oxygen from the dissociated H2O molecules in the sample gas.

The ambient humidity (e.g., absolute humidity of the fresh air surrounding the vehicle) may be determined at 518 of routine 500 based on the first pumping current and the second pumping current (or the correction first and second pumping current). For example, the first pumping current may be subtracted from the second pumping current to obtain a change in pumping current indicative of the amount of oxygen from dissociated water molecules (e.g., the amount of water) in the sample gas. This value may be proportional to the ambient humidity. The ambient humidity value may be used to correct the pumping current outputs at 416 and 430 of method 400 and/or may be stored in the memory of the controller. In other examples, engine operation may be adjusted based on the determined ambient humidity.

Returning to 510, if operating the exhaust oxygen sensor in VVs mode is not desired, the method may instead include determining ambient humidity based on an output of the exhaust oxygen sensor at the first voltage and a dry air pumping current value. Specifically, the method at 520 includes determining a dry air pumping current. For example, the method may include operating the exhaust oxygen sensor at a first, lower voltage to obtain a first output which indicates a humid air oxygen reading. The sensor may then be operated at a second, higher voltage to obtain a second output which indicates a humid air oxygen reading wherein all the humidity in the air has dissociated at the oxygen sensor. A middle voltage between the first, lower voltage and the second, higher voltage may produce an oxygen sensor output indicative of a dry air oxygen reading wherein partial dissociation of the humidity occurs. A dry air oxygen reading may then be estimated by a ratio between the first output and the second output. In this way, the dry air oxygen reading may be determined by operating the oxygen sensor in VVs mode. At 520, the controller may look up the most recently stored value of the dry air pumping current to use at 520.

The method continues on to 522 to apply the first, lower reference voltage (e.g., base voltage, V1) to the exhaust oxygen sensor and a pumping current (IpB) is received. As such, the method at 522 includes not operating the oxygen sensor in VVs mode and instead maintaining the reference voltage of the sensor at a lower, base level that reduces oxygen sensor degradation. Said another way, the method at 522 includes not modulating the reference voltage of the oxygen sensor between a lower first voltage and a higher second voltage. The resulting pumping current may be indicative of the amount of oxygen in the sample gas.

The routine then continues on to 524 to determine ambient humidity based on IpB (the pumping current determined at 522 during non-VVs sensor operation) and the dry air pumping current determined and/or looked up at 520. The amount of oxygen reduction due to the dilution effect of ambient humidity may then be determined based on the difference between the dry air pumping current and the pumping current IpB determined at 522. By multiplying by a conversion factor, this difference may then be converted from a pumping current to a humidity percentage. In this way, by comparing the output of the oxygen sensor operating in non-VVs mode at the base reference voltage to a stored dry air pumping current value, ambient humidity may be determined with continuously operating the oxygen sensor in VVs mode. The ambient humidity value determined at 524 may then be used to correct the pumping current outputs at 416 and 430 of method 400 and/or may be stored in the memory of the controller. In other examples, engine operation may be adjusted based on the determined ambient humidity.

FIG. 6 shows method 600 for estimating an exhaust air/fuel ratio (e.g., A/F) during variable voltage operation of an exhaust oxygen sensor. Method 600 may be employed by the controller when the exhaust oxygen sensor for estimating exhaust pressure, as explained above, is the same sensor as the exhaust oxygen sensor used for estimating the exhaust air/fuel ratio (e.g., the same as the air/fuel sensor). During method 600, a pumping current output by an exhaust oxygen sensor (e.g. oxygen sensor 126) may be compared to a reference pumping current. The reference pumping current may be an expected pumping current based on a reference voltage applied to the oxygen sensor, and a known relationship between the pumping current and air/fuel ratio. In other words, a series of pumping current-to-air/fuel ratio transfer functions at different sensor reference voltages may be used for determining the reference pumping current. Thus, a known relationship between pumping current and air/fuel ratio at a given reference voltage of the oxygen sensor (e.g. transfer function), may be compared to a pumping current output by the oxygen sensor to give an offset. The offset may then be used to estimate the air/fuel ratio. Instructions for carrying out method 600 may be stored in a memory of an engine controller, such as controller 12 shown in FIG. 1. Further, method 600 may be executed by the controller.

Method 600 begins at 602 by estimating and/or measuring engine operating conditions. Engine operating conditions may be based on feedback from a plurality of sensors and may include: engine temperature, engine speed and load, intake mass air flow, manifold pressure, etc.

At 604, the controller may operate the exhaust oxygen sensor (e.g., oxygen sensor 126 or 200 shown in FIGS. 1-2) as an air/fuel sensor and measure a first pumping current (Ip) generated by a lower, first reference voltage applied to the oxygen sensor. The lower, first reference voltage may be a reference voltage low enough such that water vapor and carbon dioxide are not dissociated (e.g., approximately 450 mV). The first pumping current of the oxygen sensor at the first reference voltage may be relatively unaffected by changes in ambient humidity or ethanol concentration of the fuel because water vapor and carbon dioxide are not dissociated. Thus, the first pumping current may be directly related to an air/fuel ratio. As such, the controller may proceed to 606 to estimate the air/fuel ratio based on the pumping current measured at 604. For example, the controller may estimate the air/fuel ratio based on a change in the pumping current from a reference point when fuel was not being injected to the engine such as during a deceleration fuel shut-off (DFSO) event.

Subsequently at 608, the controller may determine if the conditions are met for operating the exhaust oxygen sensor in a variable voltage (VVs) mode to estimate exhaust pressure. Specifically, the oxygen sensor may be operated in a VVs mode when the controller determines that it is desired to estimate the exhaust pressure of the exhaust gas using the exhaust oxygen sensor, as described above with reference to FIGS. 3-4. If the controller determines that VVs operation of the oxygen sensor is not desired, then method 600 continues to 610 to estimate the air/fuel ratio based on outputs from the oxygen sensor operating at the lower first reference voltage. Said another way, the method at 610 may include continuing to operate the exhaust oxygen sensor as an air/fuel sensor at the lower, first reference voltage. The method may then proceed to 620 to adjust engine operation based on the estimated air/fuel ratio. As an example, the controller may adjust the amount of fuel injected to the engine cylinders (e.g., cylinder 30) if the estimated air/fuel ratio is different from a desired air/fuel ratio, where the desired air/fuel ratio may be based on the engine operating parameters including: engine load, engine speed, engine temperature, etc.

However, if at 608 the controller determines that it is desired for the oxygen sensor to operate in VVs mode in order to estimate exhaust pressure, method 600 may proceed to 612 to apply a higher, second reference voltage to the oxygen sensor and determine a reference Ip at the second reference voltage. The second reference voltage may be a voltage high enough to dissociate water vapor and carbon dioxide (e.g., approximately 1100 mV) and may be the second voltage required for exhaust pressure estimation. The reference Ip may be determined based on a transfer function relating the pumping current to the air/fuel ratio for a given applied reference voltage (e.g., for a given reference voltage greater than the base, first reference voltage of approximately 450 mv). Further, the transfer function may be limited to a baseline condition for the ambient humidity and ethanol concentration. In one example the baseline condition may be when the ethanol concentration and ambient humidity are both 0%. In another example the baseline condition may be based on an updated transfer function where the ambient humidity and ethanol concentration may be different than 0%. Thus, the controller may look-up a transfer function associated with the second reference voltage applied to the sensor at 612 from a plurality of transfer functions where each transfer function is assigned to a particular reference voltage. In one example, the plurality of transfer functions may be stored in a memory of the controller as a function of oxygen sensor reference voltage. An example transfer function is depicted as plot 702 in graph 700 of FIG. 7. Plot 702 relates air/fuel ratios with reference pumping currents for a particular reference voltage. Plot 702 may be associated with an applied reference voltage of 1100 mV. As such, plot 702 may represent a known relationship between pumping current and air/fuel ratio for the second reference voltage applied to the oxygen sensor in method 600 when humidity and ethanol concentration are at a baseline condition. The controller may then use the transfer function associated with the second reference voltage to determine a reference pumping current.

In one embodiment, the controller may determine the reference pumping current based on the air/fuel ratio determined at 606 during non-VVs mode operation (e.g., during operating the oxygen sensor at the lower first reference voltage), and the transfer function associated with the second reference voltage. The air/fuel ratio determined at 606 represents the most recent air/fuel ratio estimate when the oxygen sensor was operating at its lower first voltage. Thus, the controller may look-up the pumping current defined by the transfer function associated with the second reference voltage at the air/fuel ratio determined at 606. As an example, the air/fuel ratio estimated at 606 may be air/fuel ratio $A_1$ depicted in graph 700. As seen in graph 700, the air/fuel ratio $A_1$ defines a point $X_1$ on plot 702. Point $X_1$ has an associated pumping current $P_1$. Thus, $P_1$ may be an example of the reference pumping current determined by the controller at 612. Since the reference voltage of the oxygen sensor may be adjusted from the lower first voltage to the higher second voltage over a very short time interval, the air/fuel ratio may be relatively the same during the transition between the two reference voltages. Point $X_1$ therefore may represent the reference pumping current that would be expected at the current air/fuel ratio in the exhaust gas, under baseline humidity and ethanol concentration conditions.

In another embodiment, the controller may determine the reference pumping current based on a pre-set air/fuel ratio and a transfer function associated with the second reference voltage. As an example, the pre-set air/fuel ratio may be 1, as depicted in graph 700. As seen in graph 700, the air/fuel ratio of 1 may define a point $X_2$ on plot 702. Point $X_2$ has an associated pumping current $P_2$. Thus, $P_2$ may be the reference pumping current determined by the controller at 612. The controller may therefore determine the reference pumping current by looking up pumping current defined by the transfer function associated with the second reference voltage at a pre-set air/fuel ratio. As an example, point $X_2$ in graph 700 may therefore represent a reference pumping current that would be expected for the applied second reference voltage for a pre-set air/fuel ratio.

Thus, the reference Ip may be determined based on the most recent air/fuel ratio estimate when the oxygen sensor was operating at its lower first voltage, and/or based on a pre-set air/fuel ratio.

Once the controller has determined the reference pumping current at 612, the controller may then proceed to measure the actual pumping current output by the oxygen sensor at the higher second reference voltage at 614. As an example, the measured pumping current at the higher second reference voltage may be at a level $P_3$ as depicted in graph 700 of FIG. 7. As depicted, $P_3$ may be greater than $P_1$ and $P_2$. In another examples, $P_3$ may be less than $P_2$, but greater than $P_1$. In another example, $P_3$ may be less than $P_1$ and $P_2$. The measured pumping current $P_3$ may be different than the reference pumping current due to changes in the ambient humidity and/or ethanol concentration of the fuel from the baseline condition. Then, at 616, the controller may determine an Ip offset based on the measured Ip at 614 and the reference Ip determined at 612.

In one embodiment, the Ip offset may be determined based on a difference between the reference Ip and the actual measured Ip at the higher second reference voltage. The reference Ip may be the reference Ip determined based on the most recent air/fuel ratio estimate when the oxygen sensor was operating at its lower first reference voltage. As an example, in graph 700 of FIG. 7, the difference, D, may be the difference between the reference pumping current $P_1$ and the actual measured pumping current $P_3$. As explained in the above embodiment, the air/fuel ratio may be assumed to remain constant at $A_1$ during the transition from the lower first to higher second reference voltage. Thus, point $X_3$ may define the measured pumping current $P_3$ at the same air/fuel ratio as the reference pumping current defined at point $X_1$.

Figure 7:
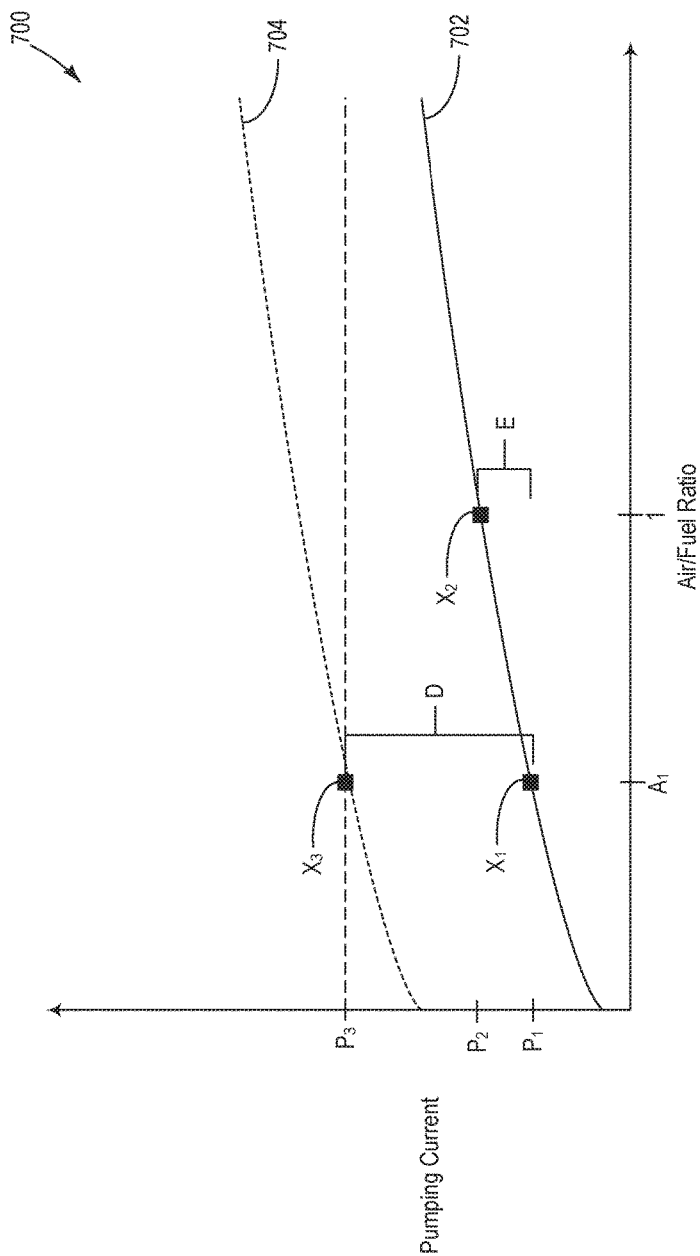
FIG. 7 shows a graph depicting changes in air/fuel estimates under varying engine operating conditions using an exhaust oxygen sensor.

The difference D, may therefore represent a difference between the reference pumping current and the measured pumping current for the current air/fuel ratio. The Ip offset may therefore shift the transfer function for the associated reference voltage by the amount of difference between the reference Ip and the actual measured Ip. As an example, in FIG. 7, plot 702 may be shifted vertically upwards by the amount D. In other words, the controller may update the transfer function for an associated reference voltage based on the difference between the measured Ip and the reference Ip. As an example, the updated or shifted transfer function may be plot 704 in graph 700 of FIG. 7. The air/fuel ratio may therefore be determined by looking up the point on the updated transfer function defined by the measured pumping current.

It is important to note that under the current embodiment, the Ip offset may be updated continually or after a pre-set duration. The duration may be an amount of time, number of engine cycles, etc. As such, the reference Ip may change if the transfer function is shifted as a result of an update of the transfer function. However, if the transfer function is not updated and the measured pumping current changes, then those changes in pumping current may be associated with changes in the air/fuel ratio. Air/fuel ratios may therefore be determined by looking up the associated air/fuel ratio for the measured pumping current as defined by the most recently updated transfer function.

In another embodiment, the Ip offset may be established by comparing the measured Ip to a reference Ip defined by a transfer function associated with the higher second reference voltage of the oxygen sensor for a pre-set air/fuel ratio. Changes in the Ip away from the reference Ip may be associated with an air/fuel measurement. As an example, the pumping current $P_3$ as shown in graph 700 of FIG. 7 may be the measured pumping current at the higher second reference voltage. Just as in the previous embodiment, a difference may be established between the measured pumping and a pumping current established based on the transfer function for the second reference voltage and the most recent air/fuel ratio estimated when the oxygen sensor was operating at the lower first reference voltage. However, instead of shifting the transfer function, the measured pumping current may be superimposed on the transfer function for the higher second reference voltage under baseline humidity and ethanol concentration conditions. As an example, in FIG. 7, point $X_3$ may be shifted down to point $X_1$. The controller may then determine the Ip offset based on the difference between the reference pumping current and the shifted measured Ip. As an example, in graph 700 the difference E may be the Ip offset, which may be the difference in pumping current between the reference pumping current for the pre-set air/fuel ratio at $X_2$, and the shifted measured pumping current $P_1$ and point $X_1$ on the transfer function represented as plot 702. Changes in the Ip offset may then be associated with changes in the air/fuel ratio. It is important to note that in the current embodiment, the baseline transfer function is not modified and as such may represent conditions of 0% humidity and ethanol concentration of the fuel. Additionally the Ip offset may be updated continuously, or after a duration, where the duration may be pre-set based on an amount of time, number of engine cycles, etc. Thus, the air/fuel ratio may be estimated by determining the pumping current based on the Ip offset, and then looking up the air/fuel ratio defined on the transfer function defined by the offset pumping current.

After determining the Ip offset at 616, the controller may then estimate the air/fuel ratio at 618 based on the Ip offset and the reference Ip. As described above the Ip offset may be used to match the measured pumping current to a transfer function which may define a corresponding air/fuel ratio. In one example, the transfer function may be adjusted by the Ip offset, and the air/fuel ratio may be determined by the air/fuel ratio defined by the value for the adjusted transfer function associated with the measured Ip. In another example, the measured Ip is adjusted by the Ip offset and the air/fuel ratio may be determined by the air/fuel ratio defined by the value for a reference transfer function associated with the measured Ip.

After estimating the air/fuel ratio at the second higher reference voltage of the oxygen sensor at 618, the controller may continue to 620 and adjust engine operation based on the estimated air/fuel ratio. In one example, the controller may adjust the amount of fuel being injected to the engine cylinders (e.g., cylinder 30) based on a desired amount of fuel. The desired amount of fuel may be determined based on engine operating parameters such as engine load, engine speed, engine temperature, EGR flow, etc.

Method 600 may then proceed to 622 and the controller may continue to estimate the air/fuel ratio based on the determined Ip offset at 616. Thus, as long as the oxygen sensor continues to operate at the same higher second reference voltage, the same Ip offset determined at 616 may be used to estimate the air/fuel ratio. As such, subsequent changes in the pumping current may be indicative of changes in the air/fuel ratio. As an example, if the Ip offset adjusts the transfer function associated with the higher second reference voltage, then the measured pumping current may be looked up on the adjusted transfer function, and the associated air/fuel ratio may be used as the air/fuel ratio estimate. Thus, changes in pumping current occurring after the Ip offset has been established may be associated with changes in the air/fuel ratio, which can be estimated by looking up the air/fuel ratios corresponding to the measured pumping currents on the adjusted transfer function. In another example, if the Ip offset adjusts the pumping currents output by the oxygen sensor, and not the transfer function, then changes in the adjusted pumping currents may be looked up on the transfer function and the associated air/fuel ratios may be used to estimate the air/fuel ratio.

In this way, engine exhaust pressure may be estimated based on outputs of an exhaust oxygen sensor disposed in an exhaust passage of an engine. More specifically, a controller may obtain a first output of the oxygen sensor while operating the oxygen sensor at a higher, second reference voltage where water molecules are dissociated at the sensor. Then, the controller may obtain a second output of the oxygen sensor while operating at the same second voltage and at a same air/fuel ratio as during generating the first output. Changes in the exhaust pressure may then be determined based on a difference between the first and second outputs, with the change in exhaust pressure increasing for larger differences between the first and second outputs. By comparing outputs of the oxygen sensor at the higher, second voltage, changes in exhaust pressure may be detected with a higher sensitivity than outputs of the oxygen sensor at a lower, first voltage (e.g., base voltage of approximately 450 mV). Additionally, by operating the sensor at the higher, second voltage, the exhaust pressure may be estimated during engine fueling conditions, as well as non-fueling conditions. This may allow exhaust pressure to be estimated more accurately at a wider range of engine operating conditions. As a result, engine control based on exhaust pressure estimates may be improved.

As one embodiment, a method comprises estimating an exhaust pressure of exhaust gas flowing through an engine exhaust passage based on a difference between a first output of an oxygen sensor disposed in the exhaust passage and a second output of the oxygen sensor, both the first and second outputs taken after increasing a reference voltage of the oxygen sensor from a lower, first voltage to a higher, second voltage. In one example, the method further comprises generating the second output during engine operation at a same air-fuel condition and at a same second voltage as during generating the first output. Additionally, the method includes generating the second output during engine fueling while air-fuel ratio control is enabled. In another example, the method further comprises estimating a change in exhaust pressure based on a difference between the first and second outputs. In yet another example, the method further comprises correcting each of the first and second outputs based on ambient humidity and estimating the exhaust pressure based on the corrected first and second outputs.

The first and second outputs of the oxygen sensor are pumping currents output while the oxygen sensor is operating at the second voltage. Additionally, as one example, estimating the exhaust pressure includes estimating the exhaust pressure based on a difference between the first and second outputs and a conversion factor, where the conversion factor converts a change in pumping current into an equivalent exhaust pressure.

In one example, estimating the exhaust pressure is responsive to one or more of engine operation conditions being outside a window for modeling the exhaust pressure using an exhaust pressure model based on selected engine operating conditions and a request to confirm a modeled exhaust pressure determined with the exhaust pressure model. The method may further comprise estimating an air-fuel ratio based on the second output during the estimating the exhaust pressure, while operating the oxygen sensor at the second voltage. Additionally, the method may further comprise adjusting engine operation based on the estimated exhaust pressure, wherein adjusting engine operation includes one or more of adjusting engine fueling, engine air charge, and engine boosting. As one example, the first voltage is a voltage at which water molecules are not dissociated at the oxygen sensor and the second voltage is a voltage at which water molecules are dissociated. Additionally, the oxygen sensor may be disposed in the engine exhaust passage upstream of a catalyst.

As another embodiment, a method comprises during engine fueling conditions: generating a first output of an oxygen sensor operating at a target reference voltage where water molecules are dissociated when an air-fuel ratio is at a first level, the oxygen sensor disposed in an engine exhaust passage; subsequently generating a second output of the oxygen sensor operating at the target reference voltage when the air-fuel ratio is at the first level; and estimating an exhaust pressure of exhaust gas flowing though the engine exhaust passage based on a difference between the first output and the second output. As one example, generating the first output includes generating a first pumping current output with the oxygen sensor at the target reference voltage at a known exhaust pressure. Additionally, the second output of the oxygen sensor is a second pumping current output by the oxygen sensor at the target reference voltage and estimating the exhaust pressure may include estimating the exhaust pressure based on a change in exhaust pressure between a time of generating the first output and the second output and the known exhaust pressure, where the change in exhaust pressure is based on the difference between the first output and the second output. As another example, the method further comprises adjusting the first output and the second output based on ambient humidity and estimating the exhaust pressure based on a difference between the adjusted first output and the adjusted second output. The method may further comprise estimating the ambient humidity based on a change in pumping current output by the oxygen sensor while continuously modulating a reference voltage of the oxygen sensor between a lower, first voltage and a higher, second voltage while fuel is not being injected into cylinders of an engine including the exhaust passage. The method may further comprise adjusting engine operation based on the estimated exhaust pressure, where adjusting engine operation includes one or more of adjusting engine fueling, engine air charge, engine boosting, and regeneration of a particulate filter.

In another representation, a method comprises: during a first condition when engine operating conditions are within a window (e.g., threshold ranges) for modeling an exhaust pressure, adjusting engine operation based on a first exhaust pressure estimated with an exhaust pressure model based on select engine operating conditions; and during a second condition, adjusting engine operation based on a second exhaust pressure estimated based on a first output of an exhaust oxygen sensor while operating in a variable voltage mode where a reference voltage of the oxygen sensor is at a target voltage where water molecules are dissociated and while operating the engine at a first air-fuel ratio and a second output of the exhaust oxygen sensor obtained a duration after the first output, while operating at the target voltage and while operating the engine at the first air-fuel ratio. As one example, the first condition further includes when the first exhaust pressure is within a threshold of the second exhaust pressure. The method may further comprise adjusting the first exhaust pressure based on the second exhaust pressure and adjusting engine operation based on the adjusted first exhaust pressure.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
during a first condition, when select engine operating conditions are within a window for modeling an exhaust pressure of exhaust gas flowing through an engine exhaust passage, adjusting engine operation based on a first exhaust pressure estimated with an exhaust pressure model that is based on the select engine operating conditions; and
during a second condition, adjusting engine operation based on a second exhaust pressure estimated based on a first output and a second output of an exhaust oxygen sensor disposed in the engine exhaust passage, the first output obtained while operating the exhaust oxygen sensor in a variable voltage mode where a reference voltage of the exhaust oxygen sensor is at a target voltage where water molecules are dissociated and while operating the engine at a first air-fuel ratio, the second output obtained a duration after the first output, while operating at the target voltage and while operating the engine at the first air-fuel ratio,
wherein adjusting engine operation includes one or more of adjusting engine fueling, engine air charge, engine boosting, and regeneration of a particulate filter.

2. The method of claim 1, wherein the first condition further includes when the first exhaust pressure is within a threshold of the second exhaust pressure.

3. The method of claim 2, wherein the second condition includes when the first exhaust pressure is not within the threshold of the second exhaust pressure.

4. The method of claim 1, further comprising adjusting the first exhaust pressure based on the second exhaust pressure and adjusting engine operation based on the adjusted first exhaust pressure.

5. The method of claim 1, wherein the select engine operating conditions that the exhaust pressure model is based on include conditions of exhaust gas flow through the engine exhaust passage.

6. The method of claim 1, wherein the select engine operating conditions that the exhaust pressure model is based on include engine component structure and one or more engine operating conditions, other than outputs from an exhaust oxygen sensor, the one or more engine operating conditions including engine speed, vehicle speed, engine load, intake air temperature, inferred barometric pressure, humidity, catalyst temperature, manifold absolute pressure, and throttle position.

7. The method of claim 6, wherein the engine component structure includes the design, location, and size of one or more of a catalytic converter, purge control valve, and exhaust gas recirculation system of the engine.

8. The method of claim 1, wherein the window for modeling the exhaust pressure includes the select engine operating conditions being within set threshold ranges.

9. The method of claim 1, wherein the first output of the exhaust oxygen sensor is a first pumping current output by the exhaust oxygen sensor at the target voltage and at a known exhaust pressure, wherein the second output of the exhaust oxygen sensor is a second pumping current output by the exhaust oxygen sensor at the target reference voltage, and further comprising estimating the second exhaust pressure based on a change in exhaust pressure between a time of obtaining the first output and the second output and the known exhaust pressure, where the change in exhaust pressure is based on a difference between the first output and the second output.

10. The method of claim 1, further comprising adjusting the first output and the second output based on ambient humidity and estimating the second exhaust pressure based on a difference between the adjusted first output and the adjusted second output.

11. The method of claim 10, further comprising estimating the ambient humidity based on a change in pumping current output by the exhaust oxygen sensor while continuously modulating the reference voltage of the exhaust oxygen sensor between a lower, first voltage and a higher, second voltage while fuel is not being injected into cylinders of the engine.

12. A method, comprising:
estimating a first exhaust pressure of exhaust gas flowing through an engine exhaust passage using a model that is based on select engine operating conditions;
determining a second exhaust pressure of the exhaust gas based on a difference between a first output of an oxygen sensor disposed in the engine exhaust passage and a second output of the oxygen sensor, both the first and second outputs taken after increasing a reference voltage of the oxygen sensor from a lower, first voltage to a higher, second voltage; and
adjusting engine operation based on the second exhaust pressure and not the first exhaust pressure in response to a difference between the first and second exhaust pressures being greater than a threshold,
wherein adjusting engine operation includes one or more of adjusting engine fueling, engine air charge, and engine boosting.

13. The method of claim 12, further comprising adjusting engine operation based on the first exhaust pressure or the second exhaust pressure in response to the difference between the first and second exhaust pressures being less than the threshold.

14. The method of claim 12, further comprising generating the second output during engine operation at a same air-fuel condition and at a same second voltage as during generating the first output.

15. The method of claim 14, further comprising generating the second output during engine fueling while air-fuel ratio control is enabled.

16. The method of claim 12, wherein the first and second outputs of the oxygen sensor are pumping currents output while the oxygen sensor is operating at the second voltage.

17. A system for an engine, comprising:
an exhaust oxygen sensor disposed in an exhaust passage of the engine upstream of a catalyst; and a controller with computer readable instructions for:
during a first condition, adjusting engine operation based on a first exhaust pressure estimated with an exhaust pressure model that is based on select engine operating conditions; and
during a second condition, adjusting engine operation based on a second exhaust pressure estimated based on a difference between a first output of the exhaust oxygen sensor and a second output of the exhaust oxygen sensor, both the first and second outputs taken after increasing a reference voltage of the exhaust oxygen sensor from a lower, first voltage to a higher, second voltage and while operating the engine at a same air-fuel ratio,
wherein adjusting engine operation includes one or more of adjusting engine fueling, engine air charge, engine boosting, and regeneration of a particulate filter.

18. The system of claim 17, wherein the first condition includes when the select engine operating conditions are within threshold ranges for estimating the first exhaust pressure with the exhaust pressure model.

\* \* \* \* \*